(12) United States Patent
Billotto et al.

(10) Patent No.: US 8,133,420 B2
(45) Date of Patent: Mar. 13, 2012

(54) MULTI-SEGMENT EXPANDABLE POLYMER COMPOSITIONS WHICH EXPAND IN A CONTROLLABLE DIRECTION

(75) Inventors: Frank V. Billotto, Oakland Township, MI (US); Mark P. Allen, Bruce Township, MI (US); Frank J. Flavin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 845 days.

(21) Appl. No.: 11/891,088

(22) Filed: Aug. 9, 2007

(65) Prior Publication Data

US 2008/0075864 A1    Mar. 27, 2008

Related U.S. Application Data

(60) Provisional application No. 60/836,507, filed on Aug. 9, 2006.

(51) Int. Cl.
*B29C 44/08* (2006.01)

(52) U.S. Cl. .................. 264/55; 264/45.1; 264/DIG. 5; 264/DIG. 13; 156/79

(58) Field of Classification Search .............. 264/45.1, 264/55, DIG. 5, DIG. 13; 156/79
See application file for complete search history.

(56) References Cited

U.S. PATENT DOCUMENTS

| | | | |
|---|---|---|---|
| 3,544,490 A | 12/1970 | Alexander | |
| 3,943,018 A * | 3/1976 | Petry et al. | 156/79 |
| 4,728,111 A | 3/1988 | Yoshijima et al. | |
| 4,762,654 A * | 8/1988 | Fuchigami et al. | 264/45.1 |
| 4,898,630 A * | 2/1990 | Kitoh et al. | 156/79 |
| 5,336,639 A | 8/1994 | Nagaraj et al. | |
| 5,911,940 A * | 6/1999 | Walton et al. | 264/415 |
| 6,199,940 B1 | 3/2001 | Hopton et al. | |
| 6,527,991 B1 * | 3/2003 | Bakker et al. | 264/45.9 |
| 6,617,366 B2 | 9/2003 | Sueda | |
| 7,323,128 B2 * | 1/2008 | Murata et al. | 264/45.4 |
| 7,579,068 B2 * | 8/2009 | Allen et al. | 428/304.4 |
| 2004/0021242 A1 * | 2/2004 | Liu | 264/46.4 |
| 2004/0094329 A1 | 5/2004 | Durocher et al. | |
| 2004/0234689 A1 | 11/2004 | Morganelli et al. | |
| 2004/0266898 A1 | 12/2004 | Kassa | |
| 2004/0266899 A1 * | 12/2004 | Muenz et al. | 521/135 |
| 2005/0194706 A1 | 9/2005 | Kosal | |
| 2007/0138683 A1 * | 6/2007 | Kanie et al. | 264/51 |

FOREIGN PATENT DOCUMENTS

| | | |
|---|---|---|
| EP | 452527 A1 | 10/1991 |
| EP | 457 928 A1 | 11/1991 |
| EP | 1 033 393 A2 | 9/2000 |
| WO | WO 92/02574 | 2/1992 |
| WO | WO 95/27015 A1 | 10/1995 |
| WO | WO 01/30906 | 5/2001 |
| WO | WO 03/054069 A1 | 7/2003 |
| WO | WO 2005-002950 | 1/2005 |

* cited by examiner

*Primary Examiner* — Yogendra Gupta
*Assistant Examiner* — Amjad Abraham
(74) *Attorney, Agent, or Firm* — Gary C Cohn PLLC (57) ABSTRACT

Expandable polymer compositions are used to reinforce or provide various types of insulation to cavities in structural elements. The polymer compositions include at least two different segments, which may or may not be joined. At least one of the segments will expand before another segment when heated. The first-to-expand segment forms a physical barrier to the expansion of later-expanding segments, thereby restricting the expansion of the later-expanding segment in at least one direction. In this manner, the location of the expanded polymer within the cavity can be easily and inexpensively controlled.

28 Claims, 4 Drawing Sheets

MULTI-SEGMENT EXPANDABLE POLYMER COMPOSITIONS WHICH EXPAND IN A CONTROLLABLE DIRECTION

CROSS-REFERENCE TO RELATED APPLICATION

This application claims benefit of U.S. Provisional Application No. 60/836,507, filed 9 Aug. 2006.

BACKGROUND OF THE INVENTION

The present invention relates to expandable polymer compositions and uses thereof as foam-in-place reinforcement and/or insulation materials.

Polymeric foams are finding increasing application in the automotive industry. These foams are used for structural reinforcement, preventing corrosion and damping sound and vibration. In many cases, manufacturing is simplest and least expensive if the foam can be formed in place where it is needed, rather than assembling a previously-foamed part to the rest of the structure. For this reason, a variety of types of foamable compositions have been developed. These include formulations that are based on diverse polymers such as polyurethanes, epoxy resins and various ethylene copolymers. The formulation is inserted into a cavity where the foam is needed, and heated. The applied heat causes the formulation to expand and cure or crosslink to form a cellular structure.

In simple cases, the entire cavity is to be filled. Usually, accomplishing this is simply a matter of providing the cavity with enough of the expandable composition. In more complicated cases, only a portion of the cavity needs to be filled. For example, adequate sound and vibration dampening or corrosion protection may be achieved in some instances by filling only a portion of a cavity. It may be important in other cases to keep a portion of the cavity accessible for adjustment or repair purposes. In such cases, filling the entire cavity adds expense and weight but provides little additional benefit, and may even be detrimental.

Partial cavity filling is simple only in the case where the bottom portion of the cavity is to be filled. In that situation, the expandable composition can be inserted into the bottom of the cavity and allowed to foam upward to fill that portion of the cavity where the foam is needed. The amount of expandable composition that is added largely controls the extent to which the cavity is filled. By using more or less of the expandable composition, the cavity can be more or less filled.

The problem of partial cavity filling becomes much more difficult when the cavity has a complex shape, or when the bottommost portions of the cavity are to remain unfilled. The expandable compositions will tend to expand downwardly under the influence of gravity, and if supported from below tend to expand isotropically in all directions unless constrained in some manner. Therefore, it has been necessary to provide some mechanical means by which the expandable composition can be retained in the proper place in the cavity, and by which the direction of expansion can be controlled so only the desired portions of the cavity become filled with the expanded polymer. A variety of supports, baffles and dams have been used for that purpose. These all introduce complexity and cost, and often add unwanted weight.

What is desired is a simple, inexpensive method by which cavities can be partially filled with an expanded polymer composition.

SUMMARY OF THE INVENTION

In one aspect, this invention is a method comprising
1) inserting at least two segments of a solid, thermally expandable polymer composition into a cavity,
2) heating the thermally expandable polymer composition in the cavity to a temperature sufficient to expand the segments of the polymer composition and
3) permitting the segments of the polymer composition to expand to form a foam that fills at least a portion of the cavity, wherein, under the conditions of heating, at least one first segment of the polymer composition expands before at least one second segment to form a barrier which constrains expansion of the second segment in at least one direction within the cavity.

The sequential expansion of the two segments provides several benefits. As mentioned, the segment(s) that expand first will form a physical barrier to the expansion of the other segment(s), directing the subsequent expansion of those segments to portions of the cavity where the foam is desired, while preventing expansion in the other directions. As will be explained in more detail below, a later-expanding segment can act as a support for the first-to-expand segment, maintaining it in position within the cavity until the first segment has expanded. Then, the expanded first segment can in turn act as a support for the later-expanding segment(s), maintaining it in the desired position in the cavity until the polymer composition has fully expanded.

This invention is also a solid, non-tacky thermally expandable polymer composition comprising at least a first segment and a second segment, wherein each of said first and second segments expands to at least 1000% of its initial volume when heated to a temperature within the range of 120° C. to 300° C., and said first segment expands at a lower temperature than said second segment.

DETAILED DESCRIPTION OF THE INVENTION

Figure 1A:
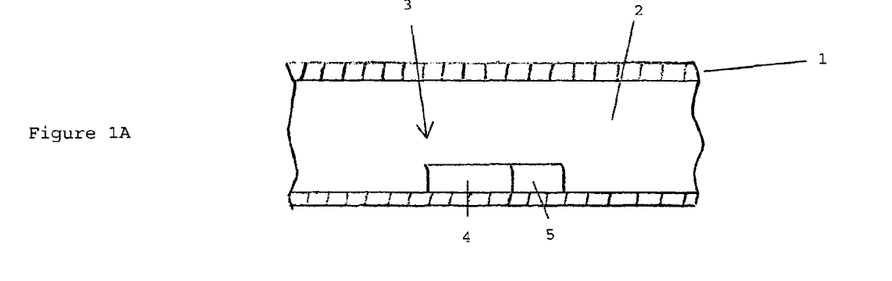
FIGS. 1A, 1B and 1C are frontal views, in section, of an embodiment of the invention.
Figure 1B:
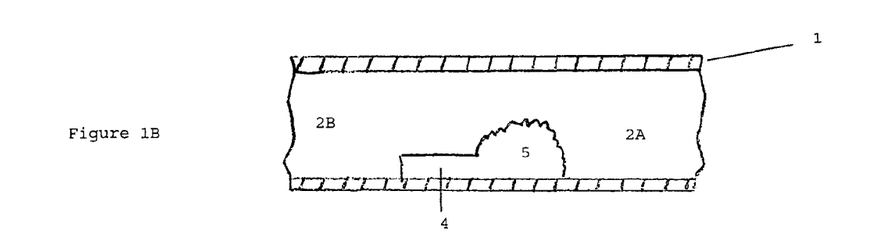
Figure 1C:
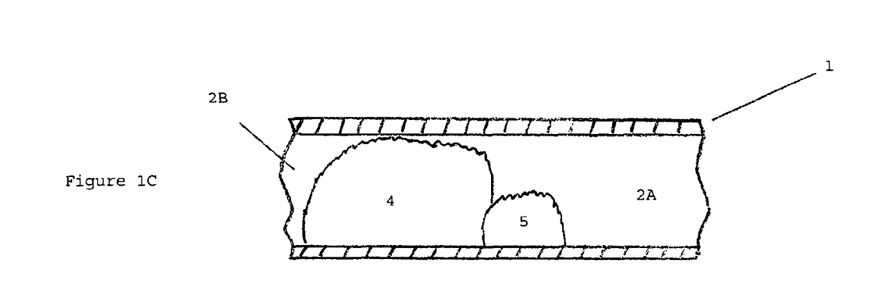

FIG. 1 illustrates the operation of an embodiment of the invention. In FIG. 1A, structural member 1 (shown in cross-section) defines cavity 2. Located within cavity 2 is expandable polymer composition 3, which consists of segments 4 and 5. In this embodiment, segment 5 will expand before segment 4 when the assembly is heated. As the temperature of the assembly rises as it is heated, the temperature of the expandable polymer composition increases, causing segment 5 to expand, as shown in FIG. 1B. Segment 4 expands after segment 5. The previously-expanded segment 5 acts as a physical barrier to the expansion of segment 4, preventing it from expanding towards the end 2A of cavity 2. Segment 4 therefore expands mainly upwardly and away from expanded segment 5, towards section 2B of cavity 2, as shown in FIG. 1C. Section 2A of cavity 2 remains largely unfilled.

In the embodiment shown in FIG. 1, segments 4 and 5 are roughly equal thickness. In such a case, the sequencing of expansion of segments 4 and 5 can be due to compositional differences between the expandable compositions that make up segments 4 and 5, respectively. Approaches to varying the composition of the expandable compositions to achieve this sequencing are described more fully below, but in many embodiments these compositional differences will relate to the temperature at which the blowing agent becomes activated. This can be achieved by using different blowing agents in the two segments, by using different accelerators/catalysts for the blowing reaction, by including a thermally conductive filler in one of the segments, or by other methods. Less preferably, the sequencing can be effected by applying heat to segment 5 at a different (i.e., faster) rate than segment 4 is heated.

Figure 2A:
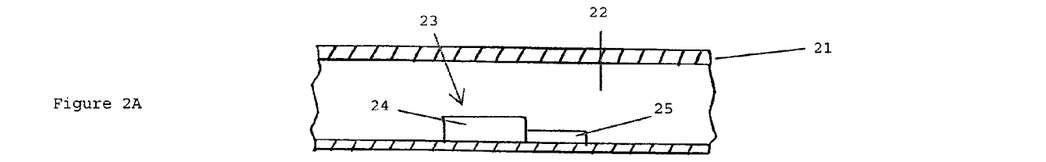
FIGS. 2A, 2B and 2C are frontal views, in section, of a second embodiment of the invention.
Figure 2B:
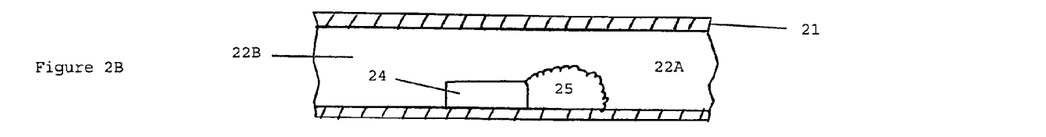
Figure 2C:
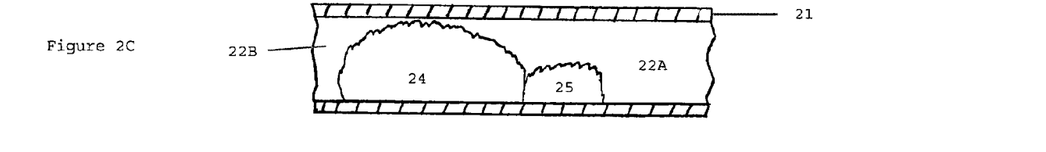

FIG. 2 illustrates a second embodiment of the invention. In FIG. 2A, structural member 21 (shown in cross-section) defines cavity 22. Located within cavity 22 is expandable polymer composition 23, which consists of segments 24 and 25. Segment 24 is significantly thicker than segment 25. Similarly to the embodiment shown in FIG. 1, segment 25 will expand first when the assembly is heated, as shown in FIG. 2B. Segment 24 expands later in the process. As before, the previously-expanded segment 25 acts as a physical barrier to the expansion of segment 24, preventing it from expanding towards the end 22A of cavity 22. Segment 24 therefore expands mainly upwardly and away from expanded segment 25, towards section 22B of cavity 22, as shown in FIG. 2C. Section 22A of cavity 22 remains largely unfilled.

In this embodiment, it is possible for segments 24 and 25 to have the same composition. In such a case, the sequencing of the expansion of segments 24 and 25 is created simply because segment 25 increases in temperature more rapidly due to its thinner cross-section, and therefore begins to expand before segment 24 has become heated sufficiently to expand. It is also possible that segments 24 and 25 have differing compositions, as described with respect to the embodiment shown in FIG. 1, which allow segment 25 to expand before segment 24.

Figure 3A:
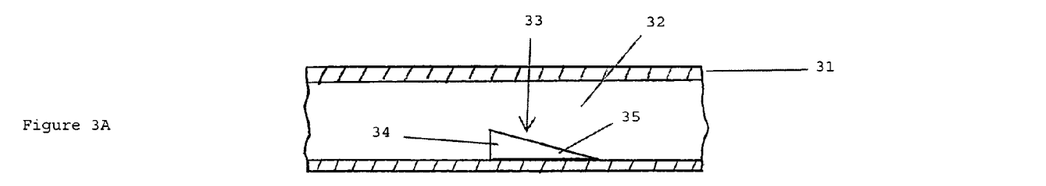
FIGS. 3A, 3B and 3C are frontal views, in section, of a third embodiment of the invention.
Figure 3B:
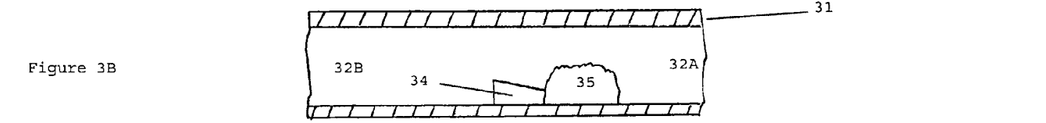
Figure 3C:
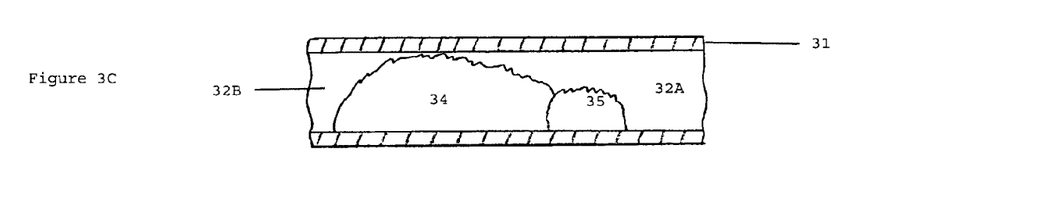

FIG. 3 illustrates a variation of the embodiment shown in FIG. 2, in which the thickness of expandable composition 33 changes continuously rather than abruptly. In FIG. 3A, structural member 31 (shown in cross-section) defines cavity 32. Located within cavity 32 is expandable polymer composition 33, which consists of a thicker segment 34 and a thinner segment 35. The boundary between segments 34 and 35 is indicated somewhat arbitrarily in FIG. 3A, the important feature being that at least a portion of segment 35 will expand before segment 34 does when the assembly is heated, as shown in FIG. 3B. Segment 34 expands later in the process. As before, the previously-expanded segment 35 acts as a physical barrier to the expansion of segment 34, preventing it from expanding towards the end 32A of cavity 32. Segment 34 therefore expands mainly upwardly and away from expanded segment 35, towards section 32B of cavity 32, as shown in FIG. 3C. Section 32A of cavity 32 remains largely unfilled.

As with the embodiment illustrated in FIG. 2, segments 34 and 35 may have the same or differing compositions.

Figures 4A, 4B, 4C:
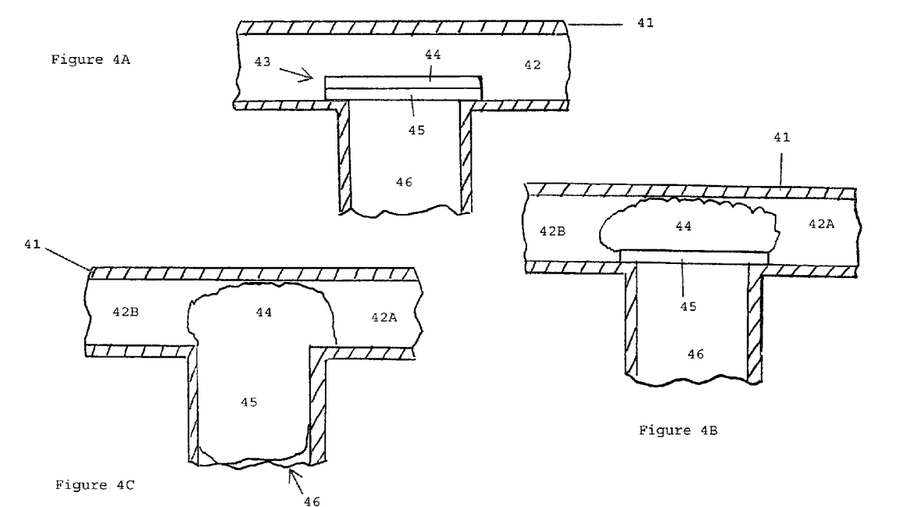
FIGS. 4A, 4B and 4C are frontal views, in section, of a fourth embodiment of the invention.

FIG. 4 illustrates an embodiment in which expansion occurs mainly in a vertical, rather than horizontal, direction. In this embodiment, structural member 41 defines a T-shaped cavity having cavity sections 42 and 46. As shown, cavity section 42 is oriented approximately horizontally and cavity section 46 is oriented approximately vertically. However, the particular orientation of the cavity sections (and their relative orientations to each other) is not considered to be particularly critical to the invention. In this embodiment, it is desired to fill cavity section 46 with the expanded polymer while keeping ends 42A and 42B of cavity 42 open.

In FIG. 4, expandable polymer composition 43 consists of segments 44 and 45. As shown in FIG. 4A, expandable polymer composition 44 is slightly longer than cavity section 46 is wide, and so can rest within cavity section 42 at the top of cavity section 46. When heated, segment 44 expands first, mainly in an upward direction, to fill the portion of cavity section 42 which is directly above cavity section 46, as shown in FIG. 4B. Segment 45 remains solid as segment 44 expands, supporting expandable composition 43 and preventing it from falling down into cavity section 46. After segment 44 has completed its expansion, segment 45 expands. Its upward and left-to-right expansion is blocked by expanded segment 44, so segment 45 expands downwardly into cavity section 46, as shown in FIG. 4C.

FIG. 5 shows a variation of the embodiment shown in FIG. 4. Vertically oriented structural member 51 defines a cavity. In FIG. 5A, expandable polymer composition 53 is suspended within the cavity such that it resides above lower cavity section 52B and above upper cavity section 52A. Expandable polymer composition is shown in FIG. 5D in an isometric view. As before, expandable polymer composition 53 includes segments 54 and 55. In this embodiment, segment 54 is thicker than segment 55, as shown in FIG. 5D, where A indicates the thickness of segment 54 and B indicates the thickness of segment 55. As shown in FIG. 5B, segment 55 expands before segment 54 when the assembly is heated, forming a barrier to the downward expansion of segment 54 into cavity section 52B. Segment 54 acts to secure expandable composition 53 in place as segment 55 expands. After segment 55 has expanded, segment 54 then expands upwardly to fill at least a portion of cavity section 52A, as shown in FIG. 5C.

Figure 5A:
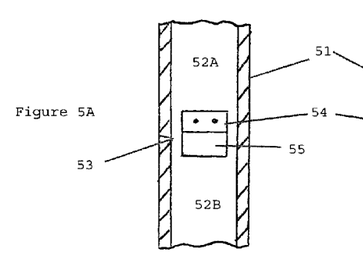
FIGS. 5A, 5B and 5C are frontal views, in section, of a fifth embodiment of the invention.
Figure 5B:
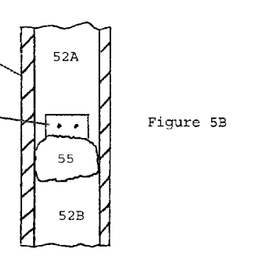
Figure 5C:
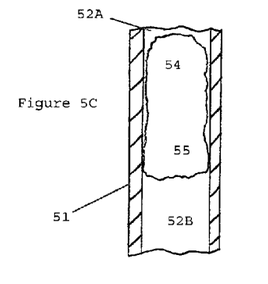
Figure 5D:
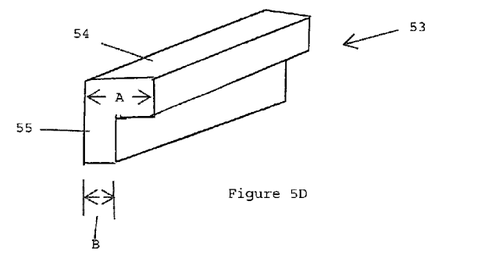
FIG. 5D is an isometric view of an expandable insert for use in the invention.

In the embodiment shown in FIG. 4, segment 44 has a different composition than segment 45, which allows it to expand first when heat is applied. Alternatively, it is possible to apply heat in such a way that segment 44 reaches its expansion temperature before segment 45 begins to expand, but as before that is a less preferred embodiment of the invention. The embodiment shown in FIG. 5 also preferably uses different compositions for each of segments 54 and 55 to effect the desired sequencing of the expansion.

Figure 6A:
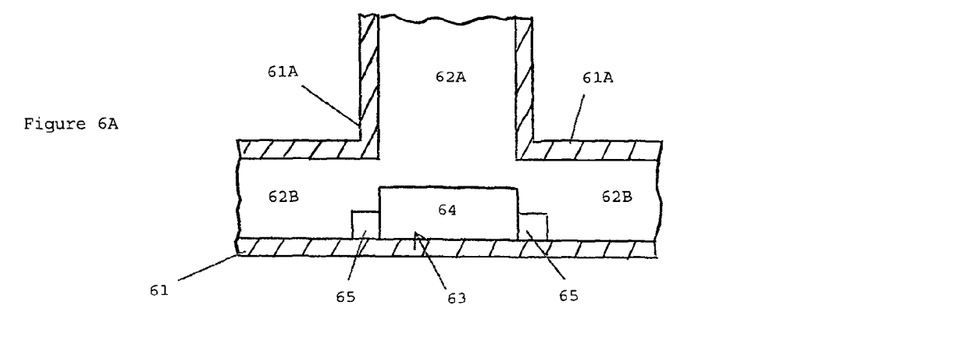
FIGS. 6A, 6B and 6C are frontal views, in section, of a sixth embodiment of the invention.
Figure 6B:
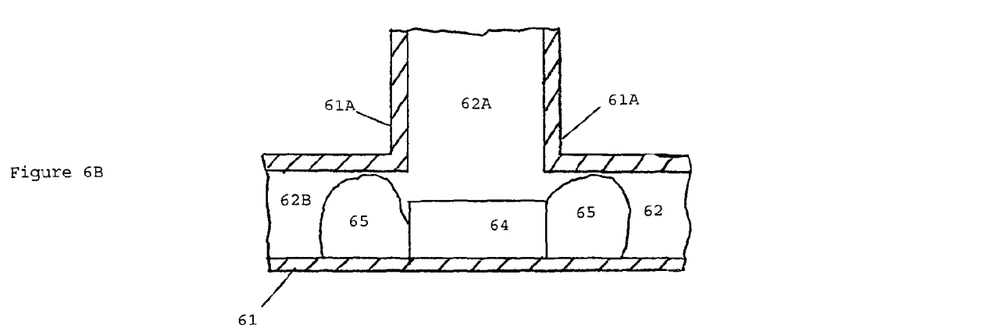
Figure 6C:
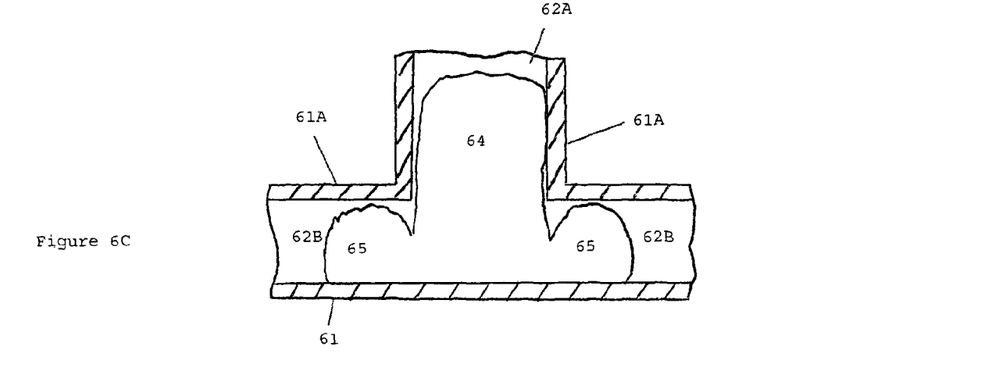

FIG. 6 illustrates yet another embodiment of the invention. Cavities 62A and 62B are defined by structural members 61 and 61A, which are shown in cross-section. As shown in FIG. 6A, expandable composition 63 consists of a thicker central segment 64 and thinner side segments 65. Segments 65 will expand first when the assembly is heated, due to their thinner cross-section. As segments 65 expand, they form a physical barrier which prevents segment 64 from expanding horizontally, as shown in FIG. 6B. Expansion of segment 64 occurs after segments 65 have expanded. The expansion of segment 64 is directed upwardly into cavity section 62A, as shown in FIG. 6C. This leaves cavity sections 62B largely unfilled.

If necessary, the unexpanded composition may be affixed in a specific location within the cavity through a variety of fasteners and the like, which can be, for example, mechanical or magnetic. Examples of such fasteners include blades, pins, push-pins, clips, hooks and compression fit fasteners. The unexpanded composition can easily be extruded or otherwise shaped such that it can be readily affixed to such a fastener. It may be cast molded over such a support or fastener. The unexpanded composition may instead be shaped in such a way that it is self-retaining within a specific location within the cavity. For example, the unexpanded composition may be extruded or shaped with protrusions or hooks that permit it to be affixed to a specific location within a cavity. It is also possible to add a metal powder to the composition in order to make the expandable composition magnetic, so it can adhere to ferromagnetic substrates. In addition, various types of adhesives can be used to secure the composition into a desired position. An adhesive tape can be used, or an adhesive can be applied directly to the surface of the composition by methods such as co-extrusion, dipping, spraying and the like.

As mentioned, the expandable composition includes at least two segments, which will expand at different times when the cavity containing the expandable composition is heated. In cases in which the two segments differ compositionally, they may be present as individual, separate pieces. Alternatively, compositionally different segments may be joined together in some manner so together they constitute a single piece or a number of pieces which contain segments of both types. Segments that are joined together in this way may be joined together in a melt processing operation, by use of an adhesive or other intermediate layer, or some combination of these. Suitable melt-processing methods include coextrusion and casting techniques. Although a support or intermediate layer may be used, it is not preferred to do so.

In particular, a support or carrier of the types described in WO 2005/002950 is usually not needed with this invention, and is preferably omitted. In many cases, later-expanding segments provide support for earlier-expanding segments during the expansion process, as already described, which eliminates a need for a separate carrier. When fasteners are used to hold the composition in place within a cavity, these fasteners preferably affix the unexpanded composition directly to a location within the cavity in which it is to be used.

Also as mentioned before, the expandable composition may contain segments that differ not in composition but in thickness. In such a case, it is preferred to form pieces which contain both segments, i.e., pieces which are formed with thicker and thinner sections. Such pieces are easily formed using melt processing methods such as extrusion. It is possible to use separate thin and thicker pieces in this embodiment as well. In general, the average thickness of the thinner segment(s) will be on the order of 80% or less, preferably 50% or less and more preferably 35% or less of that of thicker segment(s), in order to provide good differentiation between the times of their respective expansions. As shown in FIG. 2, the change in thickness between the thinner and thicker segments may be instantaneous or nearly so. Alternatively, the thickness may change gradually between the thinner and thicker segments, as shown in FIG. 3. For many automotive applications, thicker segments have an average thickness of about 5-10 mm, and thinner segments have an average thickness of about 1 to 4 mm.

The expandable composition may instead (or in addition) contain segments that differ not in composition or thickness but in surface area per unit volume or mass. The higher surface area of one of the segments permits heat to transfer more rapidly into the interior of that segment and in that manner promotes an earlier expansion. In these embodiments, one segment should have a surface area/unit volume that is at least 130%, preferably at least 150% that of another segment. An example of a segment geometry which provides a high surface area per unit volume or mass is a comb-like pattern. The 'teeth' are spaced apart, such as by a distance approximately equal to the average thickness of the segment and the tooth height is equal to or greater than the average thickness of the segment. The spacing between the teeth provides increased surface area, compared to at least one other segment of the expandable composition.

The expandable composition may be formed into a specialized shape that is designed with a particular cavity in mind. For example, it may be designed so it can be supported at a specific location within the cavity, such as is shown, for example, in FIGS. 4, 5 and 6. The volume of expandable composition that is to be used is selected in conjunction with the degree of expansion it will undergo, to provide the desired volume of expanded material.

The piece(s) of expandable composition are inserted in the cavity and oriented with respect to each other and to the cavity so that the desired portion of the cavity will be filled. Segment(s) that will expand first are positioned in the cavity in such a manner that when those segments expand, a barrier is formed which directs the expansion of the later-expanding segments.

In embodiments of particular interest, vertically oriented cavities (such as those oriented 30° or more from the horizontal) are partially filled with an expanded polymer so that a lower portion of the cavity remains unfilled, as illustrated in FIG. 5. This is preferably done by suspending the expandable composition within the cavity, with the first-to-expand (preferably, thinner) segment oriented below the later-expanding segment(s). The first-to-expand segment expands to form a "shelf" which obstructs the downward expansion of the later-expanding segments, so the later-expanding segment(s) are forced to expand upward to fill upper portions of the cavity, while at least one lower portion of the cavity remains unfilled.

The expandable composition is expanded by heating to a temperature in the range of 100 to 300° C., preferably from 140 to 230° C. and especially from 140 to 210° C. The particular temperature used will be high enough to cause the later-expanding segments to expand. This temperature is adequate to soften the polymer or polymer precursors, activate the heat-activated expansion agent and initiate the curing and/or crosslinking of the polymer or polymer precursors. For this reason, the precise expansion temperature will generally be selected in conjunction with the choice of polymer or polymer precursor, expansion agent and crosslinker(s) or curing agents. It is also preferred to avoid temperatures that are significantly higher than required to expand the composition, in order to prevent thermal degradation of the resin or other components. Expansion and cross-linking typically occurs within 1 to 60 minutes, especially from 5 to 40 minutes and most preferably from 5 to 30 minutes, once the composition attains the target temperature.

The various segments of the expandable composition expand sequentially during the heating step. The temperature of the cavity and segments of expandable composition rise as heat is applied and the assembly is brought to the final expansion temperature. As different segments reach their expansion temperature, they expand in turn. As described, the earlier-expanding segments form supports or barriers to the expansion of the later-expanding segments, and influence the direction of their expansion.

It is possible to affect the sequential expansion by applying heat to different parts of the cavity (and the respective segments of expandable composition contained therein) at different rates. This approach has the advantage of allowing the same composition to be used in all segments of the expandable composition, and to allow each segment to be of the same or similar thickness. However, this approach is generally less preferred due to the added complexity of the heating process, which can increase equipment and operating costs.

The expansion step is performed under conditions such that each segment of the composition rises freely to at least 200%, preferably to at least 500% of its initial volume. Each segment of the expandable composition more preferably expands to at least 1000% of its initial volume, and even more preferably expands to at least 1200% of its initial volume. Each segment of the composition of the invention may expand to 3500% or more of its initial volume. More typically, the segments expand to up to at least 2000%, 2500% or 3000% of their initial volume. The density of the expanded material is generally from 1 to 10 pounds/cubic foot and preferably from 1.5 to 5 pounds/cubic foot.

By "expands freely", it is meant that the composition is not maintained under pressure or other physical constraint in at least one direction, as it is brought to a temperature sufficient to initiate crosslinking and activate the expanding agent. As a result, the composition can begin to expand in at least one direction as soon as the necessary temperature is achieved, and can expand to at least 200%, preferably to at least 500% and more preferably to at least 1000% of its initial volume without constraint. Most preferably, the composition can fully expand without constraint. This free expansion process differs from processes such as extrusion foaming or bun foam processes, in which the heated composition is maintained under pressure sufficient to keep it from expanding until it passes through the die of the extruder or the pressure is released to initiate "explosive foaming". The timing of the crosslinking and expansion steps is much more critical in a free expansion process than in a process like extrusion, in which expansion can be delayed through application of pressure until enough crosslinking has been produced in the polymer.

The expandable composition is any polymeric composition that is a solid at room temperature (22° C.) and which can be expanded by heating to a temperature from 100° C. to 300° C. As discussed before, the expandable composition consists of at least two segments, one of which will, because of its composition or its geometry, expand earlier than the other when the expandable composition is heated to an elevated temperature of 100° C. to 300° C.

The polymeric composition includes at least one organic polymer or precursor to an organic polymer. The organic polymer or precursor is heat-softenable, meaning that when exposed to some elevated temperature below its decomposition temperature, the polymer or precursor will soften enough that it can be expanded by the expanding agent to form a cellular structure. Polymers and polymer precursors of particular interest include thermoplastic resins, particularly polyethylene-based compositions that contain one or more ethylene homopolymers and interpolymers as described below, polyurethane-forming compositions, and epoxy resin/hardener compositions.

Expandable polymer compositions that are based on ethylene homopolymers and interpolymers are most preferred. The ethylene homopolymer or interpolymer is preferably not elastomeric, meaning for purposes of this invention that the homopolymer or interpolymer exhibits an elastic recovery of less than 40 percent when stretched to twice its original length at 20° C. according to the procedures of ASTM 4649.

The ethylene homopolymer or interpolymer has a melt index (ASTM D 1238 under conditions of 190° C./2.16 kg load) of 0.05 to 500 g/10 minutes. The melt index is preferably from 0.05 to 50 g/10 minutes, as lower melt index polymers tend to flow more, have lower melt strength and crosslink less efficiently during the heat expansion step. A more preferred polymer has a melt index of 0.1 to 10 g/10 minutes, and an especially preferred polymer has a melt index of 0.3 to 5 g/10 minutes.

A suitable type of ethylene interpolymer is one of ethylene and at least one $C_{3-20}$ α-olefin. Another suitable type of interpolymer is one of ethylene and at least one non-conjugated diene or triene monomer. The interpolymer may be one of ethylene, at least one $C_{3-20}$ α-olefin and at least one non-conjugated diene or triene monomer. The interpolymer is preferably a random interpolymer, where the comonomer is distributed randomly within the interpolymer chains. Any of the foregoing homopolymers and copolymers may be modified to contain hydrolyzable silane groups. Ethylene homopolymers and interpolymers of these types suitably contain less than 2 mole percent of repeating units formed by polymerizing an oxygen-containing monomer (other than a silane-containing monomer). The homopolymers and interpolymers suitably contain less than 1 mole percent of such repeating units and more preferably less than 0.25 mole percent of such repeating units. They are most preferably devoid of such repeating units.

Examples of such polymers include low density polyethylene (LDPE), high density polyethylene (HDPE) and linear low density polyethylene (LLDPE). Also useful are so-called "homogeneous" ethylene/α-olefin interpolymers that contain short-chain branching but essentially no long-chain branching (less than 0.01 long chain branch/1000 carbon atoms). In addition, substantially linear ethylene α-olefin interpolymers that contain both long-chain and short-chain branching are useful, as are substantially linear, long-chain branched ethylene homopolymers. "Long-chain branching" refers to branches that have a chain length longer than the short chain branches that result from the incorporation of the α-olefin or non-conjugated diene monomer into the interpolymer. Long chain branches are preferably greater than 10, more preferably greater than 20, carbon atoms in length. Long chain branches have, on average, the same comonomer distribution as the main polymer chain and can be as long as the main polymer chain to which it is attached. Short-chain branches refer to branches that result from the incorporation of the α-olefin or non-conjugated diene monomer into the interpolymer.

LDPE is a long-chain branched ethylene homopolymer that is prepared in a high-pressure polymerization process using a free radical initiator. LDPE preferably has a density of less than or equal to 0.935 g/cc (all resin densities are determined for purposes of this invention according to ASTM D792). It more preferably has a density of from 0.905 to 0.930 g/cc and especially from 0.915 to 0.925 g/cc. LDPE is a preferred ethylene polymer due to its excellent processing characteristics and low cost. Suitable LDPE polymers include those described in U.S. Provisional application 60/624,434 and WO 2005/035566.

HDPE is a linear ethylene homopolymer that consists mainly of long linear polyethylene chains. HDPE typically contains less than 0.01 long chain branch/1000 carbon atoms. It suitably has a density of at least 0.94 g/cc. HDPE is suitably prepared in a low-pressure polymerization process using Zeigler polymerization catalysts, as described, for example, in U.S. Pat. No. 4,076,698.

LLDPE is a short-chain branched ethylene-α-olefin interpolymer having a density of less than 0.940. It is prepared in a low pressure polymerization process using Zeigler catalysts in a manner similar to HDPE. The short-chain branches are formed when the α-olefin comonomers become incorporated into the polymer chain. LLDPE typically contains less than 0.01 long chain branch/1000 carbon atoms. The density of the LLDPE is preferably from about 0.905 to about 0.935 and especially from about 0.910 to 0.925. The α-olefin comonomer suitably contains from 3 to 20 carbon atoms, preferably from 3 to 12 carbon atoms. Propylene, 1-butene, 1-pentene, 4-methyl-1-pentene, 1-hexene, 4-methyl-1-hexene, 5-methyl-1-hexene, 1-octene, 1-nonene, 1-decene, 1-undecene, 1-dodecene and vinylcyclohexane are suitable α-olefin comonomers. Those having from 4 to 8 carbon atoms are especially preferred.

"Homogeneous" ethylene/α-olefin interpolymers are conveniently made as described in U.S. Pat. No. 3,645,992, or by using so-called single-site catalysts as described in U.S. Pat. Nos. 5,026,798 and 5,055,438. The comonomer is randomly distributed within a given interpolymer molecule, and the interpolymer molecules each tend to have similar ethylene/comonomer ratios. These interpolymers suitably have a density of less than 0.940, preferably from 0.905 to 0.930 and especially from 0.915 to 0.925. Comonomers are as described above with respect to LLDPE.

Substantially linear ethylene homopolymers and copolymers include those made as described in U.S. Pat. Nos. 5,272,236 and 5,278,272. These polymers suitably have a density of less than or equal to 0.97 g/cc, preferably from 0.905 to 0.930 g/cc and especially from 0.915 to 0.925. The substantially linear homopolymers and copolymers suitably have an average of 0.01 to 3 long chain branch/1000 carbon atoms, and preferably from 0.05 to 1 long chain branch/1000 carbon atoms. These substantially linear polymers tend to be easily processable, similar to LDPE, and are also preferred types on this basis. Among these, the ethylene/α-olefin interpolymers are more preferred. Comonomers are as described above with respect to LLDPE.

In addition to the foregoing, interpolymers of ethylene and at least one nonconjugated diene or triene monomer can be used. These interpolymers can also contain repeating units derived from an α-olefin as described before. Suitable nonconjugated diene or triene monomers include, for example, 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,6-heptadiene, 1,7-octadiene, 1,8-nonadiene, 1,9-decadiene, 1,10-undecadiene, bicyclo[2.2.1]hepta-2,5-diene (norbornadiene), tetracyclododecene, 1,4-hexadiene, 4-methyl-1,4-hexadiene, 5-methyl-1,4-hexadiene and 5-ethylidene-2-norborene.

The ethylene homopolymer or interpolymer, of any of the foregoing types, can contain hydrolyzable silane groups. These groups can be incorporated into the polymer by grafting or copolymerizing with a silane compound having at least one ethylenically unsaturated hydrocarbyl group attached to the silicon atom, and at least one hydrolyzable group attached to the silicon atom. Methods of incorporating such groups are described, for example, in U.S. Pat. Nos. 5,266,627 and 6,005,055 and WO 02/12354 and WO 02/12355. Examples of ethylenically unsaturated hydrocarbyl groups include vinyl, allyl, isopropenyl, butenyl, cyclohexenyl and γ-(meth)acryloxy allyl groups. Hydrolyzable groups include methoxy, ethoxy, formyloxy, acetoxy, propionyloxy, and alkyl- or arylamino groups. Vinyltrialkoxysilanes such as vinyltriethyoxysilane and vinyltrimethyoxysilane are preferred silane compounds; the modified ethylene polymers in such cases contain triethoxysilane and trimethoxysilane groups, respectively.

Ethylene homopolymers or interpolymers having long-chain branching are generally preferred, as these resins tend to have good melt strength and/or extensional viscosities which help them form stable foams. Mixtures of long-chain branched and short-chain branched or linear ethylene polymers are also useful, as the long-chain branched material in many cases can provide good melt strength and/or extensional viscosity to the mixture. Thus, mixtures of LDPE with LLDPE or HDPE can be used, as can mixtures of substantially linear ethylene homopolymers and interpolymers with LLDPE or HDPE. Mixtures of LDPE with a substantially linear ethylene homopolymer or interpolymer (especially interpolymer) can also be used.

Other suitable ethylene interpolymers are random copolymers of ethylene with one or more oxygen-containing comonomers (which are not silanes). The comonomer is ethylenically polymerizable and capable of forming a copolymer with ethylene. Examples of such comonomers include acrylic and methacrylic acids, alkyl and hydroxyalkyl esters of acrylic or methacrylic acid, vinyl acetate, glycidyl acrylate or methacrylate, vinyl alcohol, and the like. These can be used alone or in combination with other types of ethylene homopolymer and interpolymers as described above. Specific examples of such copolymers include ethylene-vinyl acetate copolymers, ethylene-alkyl (meth)acrylate copolymer such as ethylene-methyl acrylate or ethylene butyl acrylate copolymers; ethylene-glycidyl (meth)acrylate copolymers, ethylene-glycidyl (meth)acrylate-alkyl acrylate terpolymers, ethylene-vinyl alcohol copolymers, ethylene hydroxyalkyl (meth)acrylate copolymers, ethylene-acrylic acid copolymers, and the like.

The ethylene homopolymer or interpolymer constitutes from 40 to 99% of the weight of the composition. It preferably constitutes up to 80% and more preferably up to 70% of the weight of the composition. Preferred compositions of the invention contain from 45 to 80% by weight of the ethylene homopolymer or interpolymer, or from 45 to 70% thereof. Especially preferred compositions contain from 50 to 65% by weight of the ethylene polymer or interpolymer.

Mixtures of two or more of the foregoing ethylene homopolymers or interpolymers can be used. In such a case, the mixture will have a melt index as described above.

Expandable compositions based on an ethylene homopolymer or interpolymer preferably contain a crosslinker. A crosslinker is a material that, either by itself or through some degradation or decomposition product, forms bonds between molecules of the ethylene homopolymer or interpolymer. The crosslinker is heat-activated, meaning that, below a temperature of 100° C., the crosslinker reacts very slowly or not at all with the ethylene homopolymer or interpolymer, such that a composition is formed which is storage stable at approximately room temperature (~22° C.).

There are several possible mechanisms through which the heat-activation properties of the crosslinker can be achieved. A preferred type of crosslinker is relatively stable at lower temperatures, but decomposes at temperatures within the aforementioned ranges to generate reactive species which form the crosslinks. Examples of such crosslinkers are various organic peroxy compounds as described below. Alternatively, the crosslinker may be a solid and therefore relatively unreactive at lower temperatures, but which melts at a temperature from 100 to 300° C. to form an active crosslinking agent. Similarly, the crosslinker may be encapsulated in a substance that melts, degrades or ruptures within the aforementioned temperature ranges. The crosslinker may be blocked with a labile blocking agent that deblocks within those temperature ranges. The crosslinker may also require the presence of a catalyst or free-radical initiator to complete the crosslinking reaction. In such a case, heat activation may be accomplished by including in the composition a catalyst or free radical initiator that becomes active within the aforementioned temperature ranges.

Although optional in the broadest aspects of the invention, it is highly preferred to employ a crosslinker in an expandable composition containing an ethylene homopolymer or interpolymer, especially when the melt index of the ethylene homopolymer or interpolymer is 1 or greater. The amount of crosslinking agent that is used varies somewhat on the particular crosslinking agent that is used. In most cases, the crosslinking agent is suitably used in an amount from 0.5 to 7%, based on the weight of the entire expandable composition, but some crosslinkers can be used in greater or lesser amounts. It is generally desirable to use enough of the crosslinking agent (together with suitable processing conditions) to produce an expanded, crosslinked composition having a gel content of at least 10% by weight and especially about 20% by weight. Gel content is measured for purposes of this invention in accordance with ASTM D-2765-84, Method A.

A wide range of crosslinkers can be used with the invention, including peroxides, peroxyesters, peroxycarbonates, poly(sulfonyl azides), phenols, azides, aldehyde-amine reaction products, substituted ureas, substituted guanidines, substituted xanthates, substituted dithiocarbamates, sulfur-containing compounds such as thiazoles, imidazoles, sulfenamides, thiuramidisulfides, paraquinonedioxime, dibenzoparaquinonedioxime, sulfur and the like. Suitable crosslinkers of those types are described in U.S. Pat. No. 5,869,591.

A preferred type of crosslinker is an organic peroxy compound, such as an organic peroxide, organic peroxyester or organic peroxycarbonate. Organic peroxy compounds can be characterized by their nominal 10-minute half-life decomposition temperatures. The nominal 10-minute half-life decomposition temperature is that temperature at which the half-life of the organic peroxy compound is 10 minutes under standard test conditions. Nominal half-life is the time required for 50% of the organic peroxy compound to decompose under the standard conditions. Thus, if an organic peroxy compound has a nominal 10-minute half-life temperature of 110° C., 50% of the organic peroxy compound will decompose when exposed to that temperature for 10 minutes. Preferred organic peroxy compounds have nominal 10-minute half-lives in the range of 120 to 300° C., especially from 140 to 210° C., under the standard conditions. It is noted that the organic peroxy compound may decompose at a somewhat higher or lower rate when formulated into the composition of the invention, due to interactions with other components of the composition. Examples of suitable organic peroxy compounds include t-butyl peroxyisopropylcarbonate, t-butyl peroxylaurate, 2,5-dimethyl-2,5-di(benzoyloxy)hexane, t-butyl peroxyacetate, di-t-butyl diperoxyphthalate, t-butyl peroxymaleic acid, cyclohexanone peroxide, t-butyl diperoxybenzoate, dicumyl peroxide, 2,5-dimethyl-2,5-di(t-butylperoxy)hexane, t-butylcumyl peroxide, t-butyl hydroperoxide, di-t-butyl peroxide, 1,3-di(t-butylperoxyisopropyl)benzene, 2,5-dimethyl-2,5-di-t-butylperoxy)-hexyne-3, di-isopropylbenzene hydroperoxide, p-methane hydroperoxide and 2,5-dimethylhexane-2,5-dihydroperoxide. A preferred expanding agent is dicumyl peroxide. A preferred quantity of organic peroxy crosslinkers is from 0.5 to 5 percent of the weight of the composition.

Suitable poly(sulfonyl azide) crosslinkers are compounds having at least two sulfonyl azide ($—SO_2N_3$) groups per molecule. Such poly(sulfonyl azide) crosslinkers are described, for example, in WO 02/068530. Examples of suitable poly(sulfonyl azide) crosslinkers include 1,5-pentane bis(sulfonyl azide), 1,8-octane bis(sulfonyl azide), 1,10-decane bis(sulfonyl azide), 1,18-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl) hexane, 2,7-naphthalene bis(sulfonyl azide), oxy-bis(4-sulfonylazido benzene), 4,4'-bis(sulfonyl azido)biphenyl, bis(4-sulfonylazidophenyl)methane and mixed sulfonyl azides of chlorinated aliphatic hydrocarbons that contain an average of from 1 to 8 chlorine atoms and from 2 to 5 sulfonyl azide groups per molecule.

When the ethylene homopolymer or interpolymer contains hydrolyzable silane groups, water is a suitable crosslinking agent. The water may diffuse in from a humid environment, such that ppm quantities are sufficient to complete the crosslinking reactions. Water also may be added to the composition. In this case, water suitably is used in an amount of from about 0.1 to 1.5 parts based on the weight of the composition. Higher levels of water will also serve to expand the polymer. Typically, a catalyst is used in conjunction with water in order to promote the curing reaction. Examples of such catalysts are organic bases, carboxylic acids and organometallic compounds such as organic titanates and complexes or carboxylates of lead, cobalt, iron, nickel, tin or zinc. Specific examples of such catalysts are dibutyltin dilaurate, dioctyltinmaleate, dibutyltindiacetate, dibutyltindioctoate, stannous acetate, stannous octoate, lead naphthenate, zinc caprylate and cobalt naphthenate. Polysubstituted aromatic sulfonic acids as described in WO 2006/017391 are also useful. In order to prevent premature crosslinking, the water or catalyst, or both, may be encapsulated in a shell that releases the material only within the temperature ranges described before.

Another type of crosslinker is a polyfunctional monomer compound that has at least two, preferably at least three, reactive vinyl or allyl groups per molecule. These materials are commonly known as "co-agents" because they are used mainly in combination with another type of crosslinker (mainly a peroxy compound) to provide some early-stage branching. Examples of such co-agents include triallyl cyanurate, triallyl isocyanurate and triallylmellitate. Triallylsilane compounds are also useful. Another suitable class of co-agents are polynitroxyl compounds, particularly compounds having at least two 2,2,6,6-tetramethyl piperidinyloxy (TEMPO) groups or derivatives of such groups. Examples of such polynitroxyl compounds are bis(1-oxyl-2,2,6,6-tetramethylpiperadine-4-yl)sebacate, di-t-butyl N oxyl, dimethyl diphenylpyrrolidine-1-oxyl, 4-phosphonoxy TEMPO or a metal complex with TEMPO. Other suitable co-agents include α-methyl styrene, 1,1-diphenyl ethylene as well as those described in U.S. Pat. No. 5,346,961. The co-agent preferably has a molecular weight below 1000.

The co-agent generally requires the presence of free radicals to engage in crosslinking reactions with the ethylene homopolymer or interpolymer. For that reason, a free radical generating agent is generally used together with a co-agent. The peroxy crosslinkers described before are all free radical generators, and if such crosslinkers are present, it is not usually necessary to provide an additional free radical initiator in the composition. Co-agents of this type are typically used in conjunction with such a peroxy crosslinker, as the co-agent can boost crosslinking. A co-agent is suitably used in very small quantities, such as from about 0.05 to 1% by weight of the composition, when a peroxy crosslinker is used. If no peroxy crosslinker is used, a co-agent is used in somewhat higher quantities.

Different crosslinkers used in the earlier-expanding segments may be different from those used in later-expanding segments of the expandable composition. In particular, crosslinkers that become activated at a lower temperature (within the range of 100 to 300° C.) can be used in the earlier-expanding, segments, whereas crosslinkers that become activated at a higher temperature (within the same range) can be used in the higher-expanding segments of the expandable composition.

The expanding agent similarly is activated at the elevated temperatures described before, and, similar to before, the expanding agent can be activated at such elevated temperatures via a variety of mechanisms. Suitable types of expanding agents include compounds that react or decompose at the elevated temperature to form a gas; gasses or volatile liquids that are encapsulated in a material that melts, degrades, ruptures or expands at the elevated temperatures, expandable microspheres, substances with boiling temperatures ranging from 100° C. to 300° C., and the like. The expanding agent is preferably a solid material at 22° C., and preferably is a solid material at temperatures below 50° C.

A preferred type of expanding agent is one that decomposes at elevated temperatures to release nitrogen or ammonia gas. Among these are so-called "azo" expanding agents, as well as certain hydrazide, semi-carbazides and nitroso compounds. Examples of these include azobisisobutyronitrile, azodicarbonamide, p-toluenesulfonyl hydrazide, oxybissulfohydrazide, 5-phenyl tetrazol, benzoylsulfohydroazide, p-toluoylsulfonylsemicarbazide, 4,4'-oxybis (benzenesulfonyl hydrazide) and the like. These expanding agents are available commercially under trade names such as Celogen® and Tracel®. Commercially available expanding agents that are useful herein include Celogen® 754A, 765A, 780, AZ, AZ-130, AZ1901, AZ760A, AZ5100, AZ9370, AZRV, all of which are azodicarbonamide types. Celogen®OT and TSH-C are useful sulfonylhydrazide types. Azodicarbonamide expanding agents are especially preferred.

Blends of two or more of the foregoing blowing agents may be used. Blends of exothermic and endothermic types are of particular interest.

Nitrogen- or ammonia releasing expanding agents as just described may be used in conjunction with an accelerator compound. Typical accelerator compounds include zinc benzosulphonate, various urea compounds, and various transition metal compounds such as transition metal oxides and carboxylates. Zinc, tin and titanium compounds are preferred, such as zinc oxide; zinc carboxylates, particularly zinc salts of fatty acids such as zinc stearate; titanium dioxide; and the like. Zinc oxide and mixtures of zinc oxide and zinc fatty acid salts are preferred types. A useful zinc oxide/zinc stearate blend is commercially available as Zinstabe 2426 from Hoarsehead Corp, Monaca, Pa.

The accelerator compound tends to reduce the peak decomposition temperature of the expanding agent to a predetermined range. Thus, for example, azodicarbonamide by itself tends to decompose at over 200° C., but in the presence of the accelerator compound its decomposition temperature can be reduced to 140-150° C. or even lower. The accelerator compound may constitute from 0 to 20% of the weight of the composition. Preferred amounts are from 6 to 18%. The accelerator may be added to the composition separately from the expanding agent. However, some commercial grades of expanding agent are sold as "preactivated" materials, and already contain some quantity of the accelerator compound. Those "preactivated" materials are also useful.

Another suitable type of expanding agent decomposes at elevated temperatures to release carbon dioxide. Among this type are sodium hydrogen carbonate, sodium carbonate, ammonium hydrogen carbonate and ammonium carbonate, as well as mixtures of one or more of these with citric acid.

Still another suitable type of expanding agent is encapsulated within a polymeric shell. The shell melts, decomposes, ruptures or simply expands at temperatures within the aforementioned ranges. The shell material may be fabricated from polyolefins such as polyethylene or polypropylene, vinyl resins, ethylene vinyl acetate, nylon, acrylic and acrylate polymers and copolymers, and the like. The expanding agent may be a liquid or gaseous (at STP) type, including for example, hydrocarbons such as n-butane, n-pentane, isobutane or isopentane; a fluorocarbon such as R-134A and R-152A; or a chemical expanding agent which releases nitrogen or carbon dioxide, as are described before. Encapsulated expanding agents of these types are commercially available as Expancel® 091WUF, 091WU, 009DU, 091DU, 092DU, 093DU and 950DU.

Compounds that boil at a temperature of from 120 to 300° C. may also be used as the expanding agent. These compounds include $C_{8-12}$ alkanes as well as other hydrocarbons, hydrofluorocarbons and fluorocarbons that boil within these ranges.

In certain embodiments of the invention, the expanding agent that is used in the earlier-expanding segments of the expandable composition is one that becomes activated at a lower temperature than the expanding agent that is used in the later-expanding segments. This can be accomplished by using different expanding agents in the respective segments. In the preferred case of nitrogen- or ammonia-releasing expanding agents, the difference in activation temperature can be produced by using the same expanding agent in each case, but using different proportions of accelerator compound.

Expandable compositions that contain ethylene homopolymers or interpolymers may also contain one or more antioxidants. Antioxidants can help prevent charring or discoloration that can be caused by the temperatures used to expand and crosslink the composition. This has been found to be particularly important when the expansion temperature is about 170° C. or greater, especially 190° C. to 220° C. The presence of antioxidants, at least in certain quantities, does not significantly interfere with the crosslinking reactions. This is surprising, particularly in the preferred cases in which a peroxy expanding agent is used, as these are strong oxidants, the activity of which would be expected to be suppressed in the presence of antioxidants.

Suitable antioxidants include phenolic types, organic phosphites, phosphines and phosphonites, hindered amines, organic amines, organo sulfur compounds, lactones and hydroxylamine compounds. Examples of suitable phenolic types include tetrakis methylene (3,5-di-t-butyl-4-hydroxyhydrocinnamate)methane, octadecyl 3,5-di-t-butyl-4-hydroxyhydrocinnamate, 1,3,5-tris (3,5-di-t-butyl-4-hydroxybenzyl)-s-triazine-2,4,6-(1H, 3H, 5H)trione, 1,1,3-tris (2'methyl-4'hydroxy-5't-butylphenyl)butane, octadecyl-3-(3',5'-di-t-butyl-4'-hydroxyphenyl)propionate, 3,5-bis(1,1-dimethylethyl)-4-hydroxybenzene propionic acid C13-15 alkyl esters, N,N-hexamethylene bis(3,5-di-t-butyl-4-hydroxyphenyl)proprionamide, 2,6-di-t-butyl-4-methylphenol, bis [3,3-bis-(4'hydroxy-3't-butylphenyl)butanoic acid]glycol ester (Hostanox O3 from Clariant) and the like. Tetrakis methylene (3,5-di-t-butyl-4-hydroxyhydrocinnamate)methane is a preferred phenolic antioxidant. Phenolic type antioxidants are preferably used in amount from 0.2 to 0.5% by weight of the composition.

Suitable phosphite stabilizers include bis (2,4-dicumylphenyl)pentaerythritol diphosphite, tris (2,4-di-tert-butylphenyl)phosphite, distearyl pentaerythritol diphosphite, bis-(2,4-di-t-butylphenyl)-pentaerythritol diphosphite and bis-(2,4-di-t-butyl-phenyl)-pentaerythritol-diphosphite. Liquid phosphite stabilizers include trisnonylphenol phosphite, triphenyl phosphite, diphenyl phosphite, phenyl diisodecyl phosphite, diphenyl isodecyl phosphite, diphenyl isooctyl phosphite, tetraphenyl dipropyleneglycol diphosphite, poly (dipropyleneglycol) phenyl phosphite, alkyl (C10-C15) bisphenol A phosphite, triisodecyl phosphite, tris (tridecyl) phosphite, trilauryl phosphite, tris (dipropylene glycol)phosphite and dioleyl hydrogen phosphite.

A preferred quantity of the phosphite stabilizer is from 0.1 to 1% of the weight of the composition.

A suitable organophosphine stabilizer is 1,3bis-(diphenylphospino)-2,2-dimethylpropane. A suitable organophosphonite is tetrakis(2,4-di-t-butylphenyl-4,4'-biphenylene diphosphonite (Santostab P-EPQ from Clariant).

A suitable organosulfur compound is thiodiethylene bis[3-(3,5-di-t-butyl-4-hydroxyphenyl)proprionate].

Preferred amine antioxidants include octylated diphenylamine, the polymer of 2,2,4,4-tetramethyl-7-oxa-3,20-diaza-dispiro[5.1.11.2]-heneicosan-21-on (CAS No 64338-16-5, Hostavin N30 from Clariant), 1,6-hexaneamine, N,N'-bis(2,2,6,6-tetramethyl-4-piperidinyl)-, polymers with morpholine-2,4,6-trichloro-1,3,5-triazine reaction products, methylated (CAS number 193098-40-7, commercial name Cyasorb 3529 from Cytec Industries), poly-[[6-(1,1,3,3-tetramethylbutyl)amino]-s-triazine-2,4-diyl][2,2,6,6-tetramethyl-4-piperidyl)imino]hexamethylene [(2,2,6,6-tetramethyl-4-piperidyl)imino]] (CAS No 070624-18-9 (Chimassorb 944 from Ciba Specialty Chemicals), 1,3,5-triazine-2,4,6-triamine-N,N'''-[1,2-ethanediylbis [[[4,6-bis[butyl-(1,2,2,6,6-pentamethyl-4 piperidinyl)amino]-1,3,5-triazine-2-yl]imino]-3,1-propanediyl]]-bis-[N',N''-dibutyl-N',N'-bis(1,2,2,6,6-pentamethyl-4-piperidinyl)-106990-43-6 (Chimassorb 119 from Ciba Specialty Chemicals), and the like. The most preferred amine is 1,3,5-triazine-2,4,6-triamine-N,N'''-[1,2-ethanediylbis[[[4,6-bis[butyl-(1,2,2,6,6-pentamethyl-4-piperidinyl)amino]-1,3,5-triazine-2-yl] imino]-3,1-propanediyl]]-bis-[N',N''-dibutyl-N',N'-bis(1,2,2,6,6-pentamethyl-4-piperidinyl. The composition of the invention preferably contains from 0.2 to 0.4% by weight of an amine antioxidant.

A suitable hydroxylamine is hydroxyl bis(hydrogenated tallow alkyl)amine, available as Fiberstab 042 from Ciba Specialty Chemicals.

Another suitable type of expandable composition is based on an epoxy resin or a mixture of two or more epoxy resins. The epoxy resin or mixture of epoxy resins have an average of at least about 1.8, preferably of at least about 2.0, epoxide groups per molecule. It is preferred that each epoxy resin in a mixture contains at least 1.8 epoxy groups/molecule. The epoxy resin or mixture thereof may be a solid or liquid at room temperature, provided that the expandable composition as a whole is a solid at room temperature. It is generally preferred that the epoxy resin or epoxy resin mixture itself be a solid a room temperature. If a solid, the epoxy resin or epoxy resin mixture is preferably softenable at an elevated temperature of between about 50° C. and 150° C. Suitable epoxy resin or mixtures thereof have an average epoxide equivalent weight of from 250 to 400, exclusive of any epoxy-terminated rubber materials as described more fully below.

A wide variety of polyepoxide compounds such as cycloaliphatic epoxies, epoxidized novolac resins, epoxidized bisphenol A or bisphenol F resins, butanediol polyglycidyl ether, neopentyl glycol polyglycidyl ether or flexibilizing epoxy resins can be used, but generally preferred on the basis of cost and availability are liquid or solid glycidyl ethers of a bisphenol such as bisphenol A or bisphenol F. Halogenated, particularly brominated, resins can be used to impart flame retardant properties if desired. Epoxy resins of particular interest are polyglycidyl ethers of bisphenol A or bisphenol F having an epoxy equivalent weight of about 250 to about 800. Blends of one or more polyglycidyl ethers of bisphenol A or bisphenol F with an epoxy-terminated polyalkylene oxide, particularly an epoxy-terminated poly(propylene oxide) are of particular interest. The epoxy resin may be halogenated (in particular, brominated) if desired in order to impart flame resistance.

An epoxy-based expandable composition also contains a curing agent. A large number of curing agents are useful, particularly those that require elevated temperatures (i.e., above about 50° C.) to cure. Advantageously, Lewis acids, substituted imidazoles or amine salts can be used as curing agents. Blocked amine curing agents such as those made by the reaction of approximately equimolar amounts of an anhydride and a polyamine are also useful. Such blocked amine curing agents are described in U.S. Pat. No. 4,766,183, the relevant portions of which are incorporated by reference. An especially useful curing agent is dicyandiamide. The curing agent is used in amounts sufficient to provide a complete cure, such as about 0.25 to about 10, preferably about 2 to about 5 percent of the weight of the thermosetting adhesive.

An epoxy-based expandable composition preferably contains at least one synthetic rubber. The rubber may be a liquid or a solid at room temperature. If a solid, the rubber is preferably a thermoplastic material that has a softening temperature above 50° C. and below 190° C., especially from about 100 to 150° C. Examples of such synthetic rubbers include polymers of isoprene, polyisobutylene, polybutadiene or other polymers of a conjugated diene, copolymers of a vinyl aromatic monomer with a conjugated diene monomer (such as styrene-butadiene rubbers) and copolymers of a conjugated diene monomer and a nitrile monomer (such as butadiene-acrylonitrile rubbers). Suitable diene rubbers and conjugated diene/nitrile rubbers are described in WO 01/94493. Diene rubbers and conjugated diene/nitrile rubbers containing not more than 15% by weight polymerized nitrile monomer are of particular interest. The polymerized nitrile monomer preferably constitutes no more than about 3.5%, especially from 1 to about 3.25%, of the total weight of the adhesive composition. The rubber preferably has a glass transition temperature of less than about −55° C., preferably from about −60 to about −90° C. The molecular weight ($M_n$) of the rubber is suitably about 2000 to about 6000, more preferably from about 3000 to about 5000.

Rubbers having epoxide-reactive groups may be formed into an epoxy-terminated adduct by reaction with a polyepoxide, as described in more detail in WO 01/94493. Rubbers having terminal primary amine, secondary amine or especially carboxylic acid groups are particularly suitable. Suitable carboxyl-functional butadiene and butadiene/acrylonitrile rubbers are commercially available from B. F. Goodrich under the trade names Hycar® 2000X162 carboxyl-terminated butadiene homopolymer and Hycar® 1300X31 carboxyl-terminated butadiene/acrylonitrile copolymer. A suitable amine-terminated butadiene/acrylonitrile copolymer is sold under the tradename Hycar® 1300X21. Polyepoxides as described above are suitable for forming such an adduct. Typically, the rubber and an excess of the polyepoxide are mixed together with a polymerization catalyst such as a substituted urea or phosphine catalyst, and heated to a temperature of about 100-250° C. in order to form the adduct. Preferred catalysts include phenyl dimethyl urea and triphenyl phosphine. Preferably, enough of the polyepoxide compound is used that the resulting product is a mixture of the adduct and free polyepoxide compound.

The rubber advantageously constitutes from about 1% to about 10%, preferably from about 2% to about 7%, of the total weight of the expandable composition.

An epoxy-based expandable composition contains at least one expanding agent, such as those described before. It is especially preferred to use a combination of an encapsulated physical blowing agent together with one or more chemical blowing agents.

A suitable polyurethane-based expandable composition is described in WO 2005/090455A1. The polyurethane composition includes a heat-softenable polyurethane resin or a curable polyurethane resin, a surfactant and a heat-activated expanding agent. When the polyurethane resin is a curable type, the composition further contains a curative such as a trimerization catalyst, a blocked amine curing agent, a hydroxyl-containing curing agent or encapsulated water. Useful expanding agents include those described above with respect to compositions based on ethylene homopolymers or copolymers. In addition, water is a useful expanding agent for expandable polyurethane compositions, provided that it is encapsulated or otherwise prevented from reacting with polyisocyanate groups in the composition until heated to a temperature of 100° C. to 300° C.

In addition to the components described before, the expandable composition may contain optional ingredients such as fillers, colorants, dies, preservatives, surfactants, cell openers, cell stabilizers, fungicides and the like. In particular, the composition may contain one or more polar derivatives of 2,2,6,6-tetramethyl piperidinyloxy (TEMPO) such a 4-hydroxy TEMPO, not only to retard scorch and/or boost crosslinking, but also to enhance adhesion to polar substrates.

Suitable fillers include talc, clays, silicas, calcium carbonate, graphite, glass, carbon black, plastic powders such as ABS, and the like. Magnetic particles such as ferromagnetic particles may be used as fillers, as well. Fillers such as fumed silica, bentonite clay and montmorillonite clay can act as thixotropic agents. Thixotropic fillers are preferably used in amounts up to about 8% by weight of the expandable composition. Fillers also include fibrous materials such as fiberglass.

The expandable composition may include a plasticizer for impact and thermal shock resistance improvement. Advantageously, various benzoates, adipates, terephthalates and phthalates can be used as the plasticizer. A terephthalate or phthalate, for example dibutyl phthalate, is preferred.

In addition, the expandable composition can further contain a flame retardant, such as hydrated alumina or antimony oxide.

The expandable composition is prepared by mixing the various components, taking care to maintain temperatures low enough that the expanding and other reactive material are not significantly activated. The mixing of the various components may be done all at once, or in various stages.

A preferred mixing method is a melt-processing method, in which the polymer or polymer precursor(s) are heated above their softening temperature and blended with one or more other components, usually under shear. A variety of melt-blending apparatus can be used, but an extruder is a particularly suitable device, as it allows for precise metering of components, good temperature control, and permits the blended composition to be formed into a variety of useful cross-sectional shapes. Temperatures during such a mixing step are desirably controlled low enough that any heat-activated materials as may be present do not become significantly activated. However, it is possible to exceed such temperatures if the residence time of the heat-activated materials at such temperatures is short. A small amount of activation of these materials can be tolerated. In the case of crosslinkers, the gel content produced during the mixing step should be less than 10% by weight and is preferably less than 2% by weight of the composition. Greater gel formation causes the composition to become non-uniform, and to expand poorly during the expansion step. In the case of expanding agents, enough expanding agent should remain after the mixing step so that the composition can expand to at least 100%, preferably to at least 500% and especially to at least 1000% of the initial volume during the expansion step. If expanding agent loss is expected during this processing step, extra quantities may be provided to compensate for this loss.

The crosslinking and/or expanding agents may also be added during the mixing step, or may be soaked into the polymer (pellets or powder preferably) prior to melt-mixing and fabrication of parts.

It is of course possible to use somewhat higher temperatures to melt blend those components which are not heat-activated. Accordingly, the composition can be formed by performing a first melt-blend step at a higher temperature, cooling somewhat, and then adding the heat-activated component(s) at the lower temperatures. It is possible to use an extruder with multiple heating zones to first melt-blend components that can tolerate a higher temperature, and then cool the mixture somewhat to blend in the heat-activated materials.

It is also possible to form one or more concentrates or masterbatches of various components in the polymer or polymer precursor(s), and let the concentrate or masterbatch down to the desired concentrations by melt blending with more of the polymer or polymer precursor. Solid ingredients may be dry-blended together before the melt-blending step.

A melt-blended composition of the invention is cooled to form a solid, non-tacky product. The composition can be formed into a shape that is suitable for the particular reinforcing or insulation application. This is most conveniently done at the end of the melt-blending operation. As before, an extrusion process is particularly suitable for shaping the composition, in cases where pieces of uniform cross-section are acceptable. In many cases, the cross-sectional shape of the pieces is not critical to its operation, provided that it is small enough to fit within the cavity to be reinforced or insulated. Therefore, for many specific applications, an extrudate of uniform cross-section can be formed and simply cut into shorter lengths as needed to provide the quantity of material needed for the particular application. As mentioned before, segments of different composition may be co-extruded to form a composite containing both of the segments.

If necessary for a specific application, the composition may be molded into a specialized shape using any suitable melt-processing operation, including extrusion, injection molding, compression molding, cast molding, injection stretch molding, and the like. As before, temperatures are controlled during such process to prevent premature gelling and expansion.

Solution blending methods can be used to blend the various components of the composition. Solution blends offers the possibility of using low mixing temperatures, and in that way helps to prevent premature gellation or expansion. Solution blending methods are therefore of particular use when the crosslinker and/or expansion agent become activated at temperatures close to those needed to melt-process the polymer or polymer precursor(s). A solution-blended composition may be formed into desired shapes using methods described before, or by various casting methods. It is usually desirable to remove the solvent before the composition is used in the expanding step, to reduce VOC emissions when the product is expanded, and to produce a non-tacky composition. This can be done using a variety of well-known solvent removal processes.

The expanded composition may be mainly open-celled, mainly closed-celled, or have any combination of open and closed cells. For many applications, low water absorption is a desired attribute of the expanded composition. It preferably absorbs no more than 30% of its weight in water when immersed in water for 4 hours at 22° C., when tested according to General Motors Protocol GM9640P, Water Absorption Test for Adhesives and Sealants (January 1992).

The expanded composition exhibits excellent ability to attenuate sound having frequencies in the normal human hearing range. A suitable method for evaluating sound attenuation properties of an expanded polymer is through an insertion loss test. The test provides a reverberation room and a semiechoic room, separated by a wall with a 3"×3"×10" (7.5× 7.5×25 mm) channel connecting the rooms. A foam sample is cut to fill the channel and inserted into it. A white noise signal is introduced into the reverberation room. Microphones measure the sound pressure in the reverberation room and in the semiechoic room. The difference in sound pressure in the rooms is used to calculate insertion loss. Using this test method, the expanded composition typically provides an insertion loss of 20 dB throughout the entire frequency range of 100 to 10,000 Hz. This performance over a wide frequency range is quite unusual and compares very favorably with polyurethane and other types of foam baffle materials.

The expandable composition of the invention is useful in a wide variety of applications. Applications of particular interest are structural reinforcement and sound, vibration and/or thermal insulation, appliance, a marine vehicle, an aerospace vehicle or a building member. The invention is of particular benefit in the transportation industry, and can be used to fill cavities in marine, aerospace or ground (particularly automotive) transportation vehicles. The invention can also be used to fill cavities in building members. The composition of the invention is readily deposited into a cavity that needs structural reinforcement and/or insulating, and expanded in place to partially or entirely fill the cavity. "Cavity" in this context means only some space that is to be filled with a reinforcing or insulating material. No particular shape is implied or intended. However, the cavity should be such that the composition can expand freely in at least one direction by at least 100%, preferably by at least 500% and more preferably by at least 1000% of its original volume. Preferably, the cavity is open to the atmosphere such that pressure does not build up significantly in the cavity as the expansion proceeds.

Examples of vehicular structures that are conveniently reinforced using the invention include reinforcement tubes and channels, rocker panels, pillar cavities, rear tail lamp cavities, upper C-pillars, lower C-pillars, front load beams or other hollow parts. The structure may be composed of various materials, including metals (such as cold-rolled steel, galvanized surfaces, galvaneli surfaces, galvalum, galfan and the like), ceramics, glass, thermoplastics, thermoset resins, painted surfaces and the like. Structures of particular interest are electrocoated either prior to or after the composition of the invention is introduced into the cavity. In such cases, the expansion of the composition can be conducted simultaneously with the bake cure of the electrocoating.

It is preferred that the expandable composition achieves expansion of the later-expanding segment to at least 1500% of their initial volume within 10 to 40 minutes, especially within 10 to 30 minutes.

The following examples are provided to illustrate the invention, but are not intended to limit the scope thereof. All parts and percentages are by weight unless otherwise indicated.

EXAMPLE 1

An expandable composition is prepared by 60.7 parts of LDPE (LDPE 621i, from Dow Chemical) in a Haake Blend 600 blender and adding 15 parts of azodicarbonamide (AZ130 from Crompton Industries), 7 parts of a zinc oxide/ zinc stearate mixture (Zinstaube 2426 from Hoarsehead Corp., Monaca, Pa.), 5 parts of ethylene/butyl acrylate/glycidyl methacrylate interpolymer (Elvaloy 4170, from DuPont), 8 parts of zinc oxide (Kadox™ 720, from Zinc Corporation of America). These components are mixed into the polymer in the blender. 2.5 parts of dicumyl peroxide (Perkadox BC-40BP, from Akzo Nobel) and 1.8 parts of an antioxidant mixture are then added and mixed in. The mixture is then removed and allowed to cool to room temperature. A portion of the mixture is then formed into a shaped part having two thin end segments and a thicker central segment, similar to that depicted in FIG. 6. The overall height of the part is 43 mm. The total width of the part is 62 mm. The thicker central portion is 38 mm wide and has a thickness of 7.6 mm. The thinner end segments are each 12 mm wide and have a thickness of 3.8 mm. Total part weight is 18 grams.

The part is affixed vertically onto the side of a horizontally oriented 50×75×300 mm steel cavity. The part is centered along the length of the steel cavity. The steel cavity has a glass face which permits the expansion of the part to be observed. The assembly is baked at 160° C. for 30 minutes. The thin sections expand first (after about 15 minutes) during the heating process, forming dams that prevent the subsequent expansion of the thicker central portion of the part from flowing to the left or right ends of the cavity. The result is a partially filled cavity having void spaces at both the left and right ends. The central section of the cavity is filled with the expanded polymer, with good sealing of the cavity.

EXAMPLE 2

A portion of the expandable composition of Example 1 is formed into a shaped part having a thin bottom segment and a thicker top segment, similar to that depicted in FIG. 5. The overall height of the part is 50 mm. The total width of the part is 150 mm. The thicker top portion is 7.6 mm thick. The thinner bottom segment has a thickness of 3.8 mm. Total part weight is 42.6 grams.

The part is affixed vertically onto the side of a vertically oriented 200×50×300 mm steel cavity having a glass face which permits the expansion of the part to be observed. The part is centered horizontally along the 200-mm width of the steel cavity and vertically along the 300-mm height of the cavity, with the longest dimension of the part being oriented horizontally. The assembly is baked at 160° C. for 30 minutes. The thin lower section expands first (after about 15 minutes) during the heating process, forming a barrier that closes off a lower portion (but not the lowermost portion) of the cavity. The top section expands (after about 22 minutes), its expansion being forced upward due to the presence of the barrier formed by the expanded bottom segment. The result is a partially filled cavity having a void space at the bottom. The central and top section of the cavity is filled with the expanded polymer, with good sealing of the cavity and only minor sagging.

EXAMPLE 3

Another portion of the composition described in Example 1 is formed into a block having dimensions of 11×28×5.6 mm. A second block is formed from another composition that is prepared from 65.7 parts of the LDPE resin, 20 parts of the AZ130 material, 10 parts of the Kadox™ 720 material, 2.5 parts of the Perkadox BC-40BP material and 1.8 parts of an antioxidant mixture. This composition is expected to expand at a higher temperature than that described in Example 1, due to the decreased levels of combined zinc oxide and zinc stearate components. The size of the second block is 38×28×5.6 mm.

The two blocks are assembled together to form a larger block having dimensions of 49×28×5.6 mm. The larger block is assembled onto the 50 mm side of a 25×50×300 mm steel cavity having a glass face. The block is centered on the 50 mm side of the cavity and is also with respect to the 300 mm length of the cavity. The cavity is oriented with the 300 mm length being horizontal and the 50 mm side being oriented vertically.

The assembly is heated to 160° C. for 30 minutes. The 11×28×5.6 mm segment expands first, forming a barrier at one end of the cavity. This segment forms an expanded polymer having a length of 57 mm. The larger segment then expands to a length of 89 mm, fully filling the other end of the cavity. The result is a cavity having one end completely filled, but having a void space at the other end.

What is claimed is:

1. A method comprising
   1) inserting at least two segments of a solid, thermally expandable polymer composition into a cavity, wherein the segments are joined together to form a single piece or a number of pieces that contain at least a first segment and a second segment,
   2) heating the thermally expandable polymer composition in the cavity to a temperature sufficient to expand the segments of the polymer composition and
   3) permitting the segments of the polymer composition to expand to at least 500% of their initial volumes to form a foam that fills at least a portion of the cavity, wherein, under the conditions of heating, at least one first segment of the piece or pieces of the polymer composition expands before at least one second segment of the piece or pieces of the polymer composition to form a support or barrier which constrains expansion of the second segment of the piece or pieces of the polymer composition in at least one direction within the cavity, and wherein a portion of the cavity adjacent to an expanded first segment remains unfilled after full expansion of the at least one second segment.

2. A method comprising
   1) inserting at least two segments of a solid, thermally expandable polymer composition into a cavity,
   2) heating the thermally expandable polymer composition in the cavity to a temperature sufficient to expand the segments of the polymer composition and
   3) permitting the segments of the polymer composition to expand to at least 500% of their initial volumes to form a foam that fills at least a portion of the cavity, wherein, under the conditions of heating, at least one first segment of the polymer composition expands before at least one second segment to form a support or barrier which constrains expansion of the second segment in at least one direction within the cavity, wherein said cavity is vertically oriented, and an expanded first segment constrains the downward expansion of the at least one second segment such that a portion of the cavity below the expanded composition remains unfilled after full expansion of the at least one second segment.

3. A method comprising
   1) inserting at least two segments of a solid, thermally expandable polymer composition into a cavity,
   2) heating the thermally expandable polymer composition in the cavity to a temperature sufficient to expand the segments of the polymer composition and
   3) permitting the segments of the polymer composition to expand to at least 500% of their initial volumes to form a foam that fills at least a portion of the cavity, wherein, under the conditions of heating, at least one first segment of the polymer composition expands before at least one second segment to form a support or barrier which constrains expansion of the second segment in at least one direction within the cavity, wherein said cavity is vertically oriented, and an expanded first segment constrains the upward expansion of the at least one second segment such that a portion of the cavity above the expanded composition remains unfilled after full expansion of the at least one second segment.

4. The method of claim 1, wherein said first segment has a different chemical composition than said second segment.

5. The method of claim 4, wherein said first segment and said second segment contain different blowing agents.

6. The method of claim 4 wherein said first segment and said second segment each contains a blowing agent, said first segment contains an accelerator for the blowing agent, and said second segment contains a reduced proportion of said accelerator compared to said first segment.

7. The method of claim 1 wherein said first and second segments have the same chemical composition.

8. The method of claim 7 wherein said first segment has an average thickness of 50% or less than that of said second segment.

9. The method of claim 1 wherein said first segment has a higher surface area per unit volume than said second segment.

10. The method of claim 1 wherein at least one segment expands and cures to form a polyurethane and/or polyurea polymer.

11. The method of claim 1 wherein at least one segment includes at least one epoxy resin.

12. The method of claim 1 wherein at least one segment includes at least one polymer selected from (1) a crosslinkable ethylene homopolymer, (2) a crosslinkable interpolymer of ethylene and at least one $C_{3-20}$ α-olefin or non-conjugated diene or triene comonomer, (3) a crosslinkable ethylene homopolymer or interpolymer of ethylene and at least one $C_{3-20}$ α-olefin containing hydrolyzable silane groups or (4) a mixture of two or more of the foregoing.

13. The method of claim 12 wherein the polymer includes at least interpolymer of an α-olefin and at least one copolymerizable, ethylenically unsaturated oxygen-containing monomer.

14. The method of claim 13 wherein the oxygen-containing monomer is an acrylate monomer, acrylic acid, methacrylic acid or vinyl alcohol.

15. The method of claim 1, wherein each of the first and second segments comprises
   a) from 40 to 99.5%, based on the weight of the composition, of (1) a crosslinkable ethylene homopolymer, (2) a crosslinkable interpolymer of ethylene and at least one $C_{3-20}$ α-olefin or non-conjugated diene or triene comonomer, (3) a crosslinkable ethylene homopolymer or interpolymer of ethylene and at least one $C_{3-20}$ α-olefin containing hydrolyzable silane groups or (4) a mixture of two or more of the foregoing, the homopolymer, interpolymer or mixture having a melt index of from 0.1 to 500 g/10 minutes when measured according to ASTM D 1238 under conditions of 190° C./2.16 kg load;

b) from 0 to 7% by weight, based on the weight of the composition, of a heat activated crosslinker for component a), said crosslinker being activated when heated to a temperature of at least 120° C. but not more than 300° C.;

c) from 1 to 25%, based on the weight of the composition, of a heat-activated expanding agent that is activated when heated to a temperature of at least 100° C. but not more that 300° C.;

d) from 0 to 20%, based on the weight of the composition, of an accelerator for the expanding agent;

e) from 0 to 10%, based on the weight of the composition, of a copolymer of ethylene and at least one oxygen-containing comonomer; and f) from 0 to 20%, based on the weight of the composition, of at least one antioxidant.

16. The method of claim 15, wherein the expanding agent decomposes when activated to release nitrogen, carbon dioxide or ammonia gas.

17. The method of claim 16, wherein component a) is LDPE.

18. The method of claim 17, wherein the melt index of component a) is 0.05 to 50 g/10 minutes when measured according to ASTM D 1238 under conditions of 190° C./2.16 kg load.

19. The method of claim 16, wherein the melt index of component a) is 0.2 to 50 g/10 minutes when measured according to ASTM D 1238 under conditions of 190° C./2.16 kg load.

20. The method of claim 19, wherein the crosslinking agent is a peroxide, peroxyester or peroxycarbonate compound.

21. The method of claim 20, wherein the crosslinking agent is dicumyl peroxide.

22. The method of claim 20 wherein the expanding agent is azodicarbonamide.

23. The method of claim 22 wherein the accelerator is zinc oxide or a mixture of zinc oxide and at least one zinc carboxylate.

24. The method of claim 1, wherein the cavity is contained in a part, assembly or sub-assembly of an automotive vehicle.

25. The method of claim 24, wherein the part, assembly or sub-assembly is coated with a bake-curable coating, and the heat-expansion step is conducted as the bake-curable coating is cured.

26. The method of claim 25, wherein the part, assembly or sub-assembly includes a reinforcement tube, a reinforcement channel, a rocker panel, a pillar cavity or a front load beam.

27. The method of claim 1, wherein the cavity is contained in an appliance, a marine vehicle, an aerospace vehicle or a building member.

28. The method of claim 1, wherein the composition is not carried on a support.

* * * * *